United States Patent [19]

Eberle et al.

[11] 3,974,694
[45] Aug. 17, 1976

[54] REMOTE DIGITAL INDICATOR ATTACHMENT FOR A GAS METER

[75] Inventors: Arthur C. Eberle, Columbus, Ohio; Robert G. Venendaal, Wilmington, Del.; William D. Munk, Columbus, Ohio

[73] Assignee: Columbia Gas Service Corporation, Columbus, Ohio

[22] Filed: Sept. 24, 1975

[21] Appl. No.: 616,382

[52] U.S. Cl. .......................... 73/272 A; 116/114 W; 235/1 C
[51] Int. Cl.² ..................... G01F 15/06; G06M 1/08
[58] Field of Search ................ 73/272 A; 235/91 A, 235/91 R, 1 C; 116/114 W, DIG. 7; 74/70

[56] References Cited
UNITED STATES PATENTS

| 1,102,258 | 7/1914 | Fridgen | 235/91 R |
|---|---|---|---|
| 1,540,150 | 6/1925 | Walker | 235/91 A |
| 2,553,843 | 5/1951 | Bickel et al. | 235/91 R |
| 2,733,616 | 2/1956 | Zimmerman | 73/272 A X |
| 3,270,559 | 9/1966 | Gleasman et al. | 73/272 A |
| 3,283,998 | 11/1966 | Hood et al. | 73/272 A X |
| 3,761,015 | 9/1973 | Cook | 235/91 A |

*Primary Examiner*—Richard C. Queisser
*Assistant Examiner*—Daniel M. Yasich
*Attorney, Agent, or Firm*—Sidney W. Millard

[57] ABSTRACT

A digital read-out or indicator attachment for a utility meter which features a tensioned, flexible stranded cable connected at one end to a crank driven in rotation by the index of the meter and having an opposite remotely extending end connected to operate a digital counter located in a position remote from the meter. The cable is supported between the crank and the counter by a low friction sheath having a coefficient of thermal expansion approximately equal to that of the cable.

6 Claims, 7 Drawing Figures

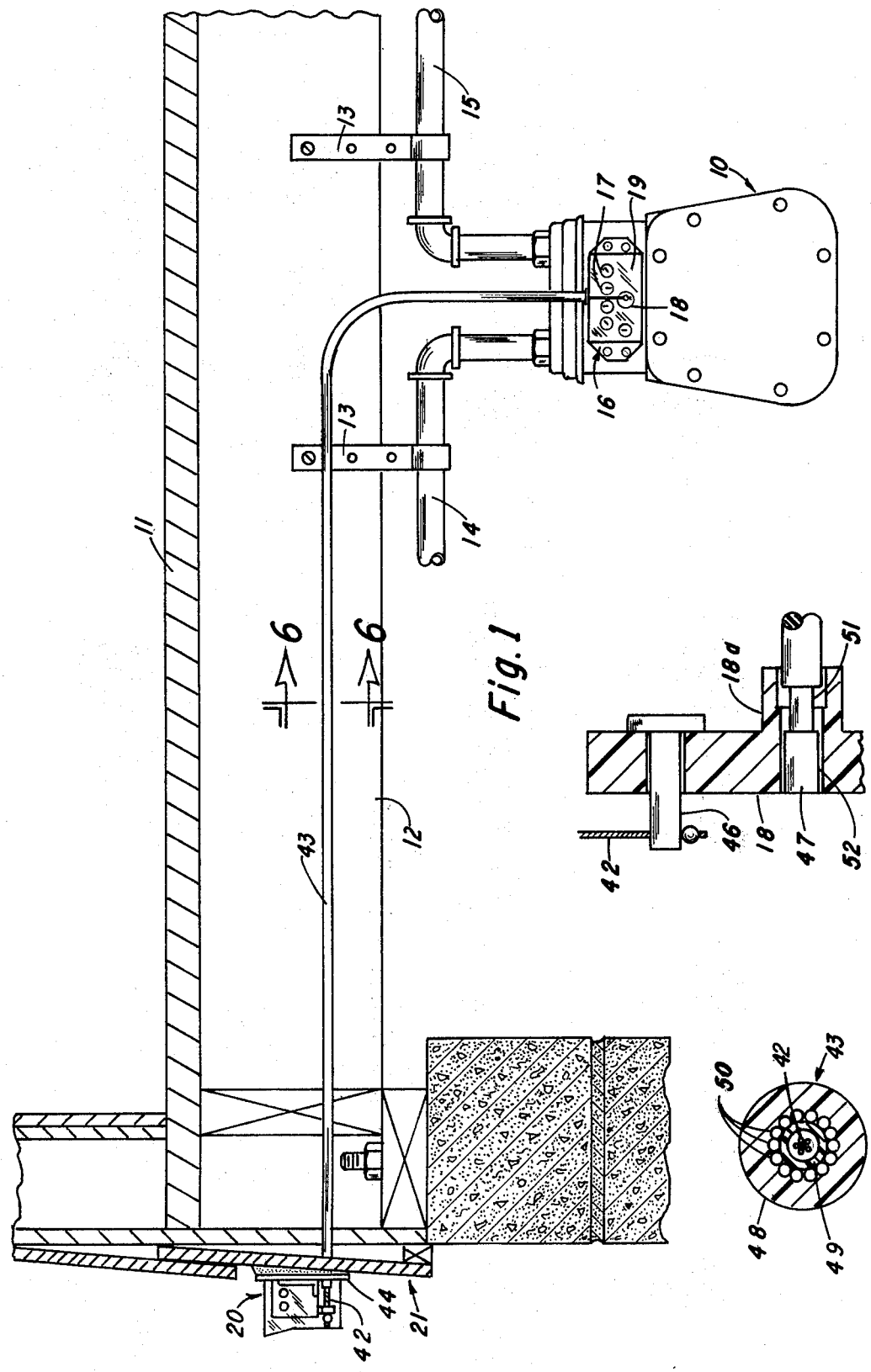

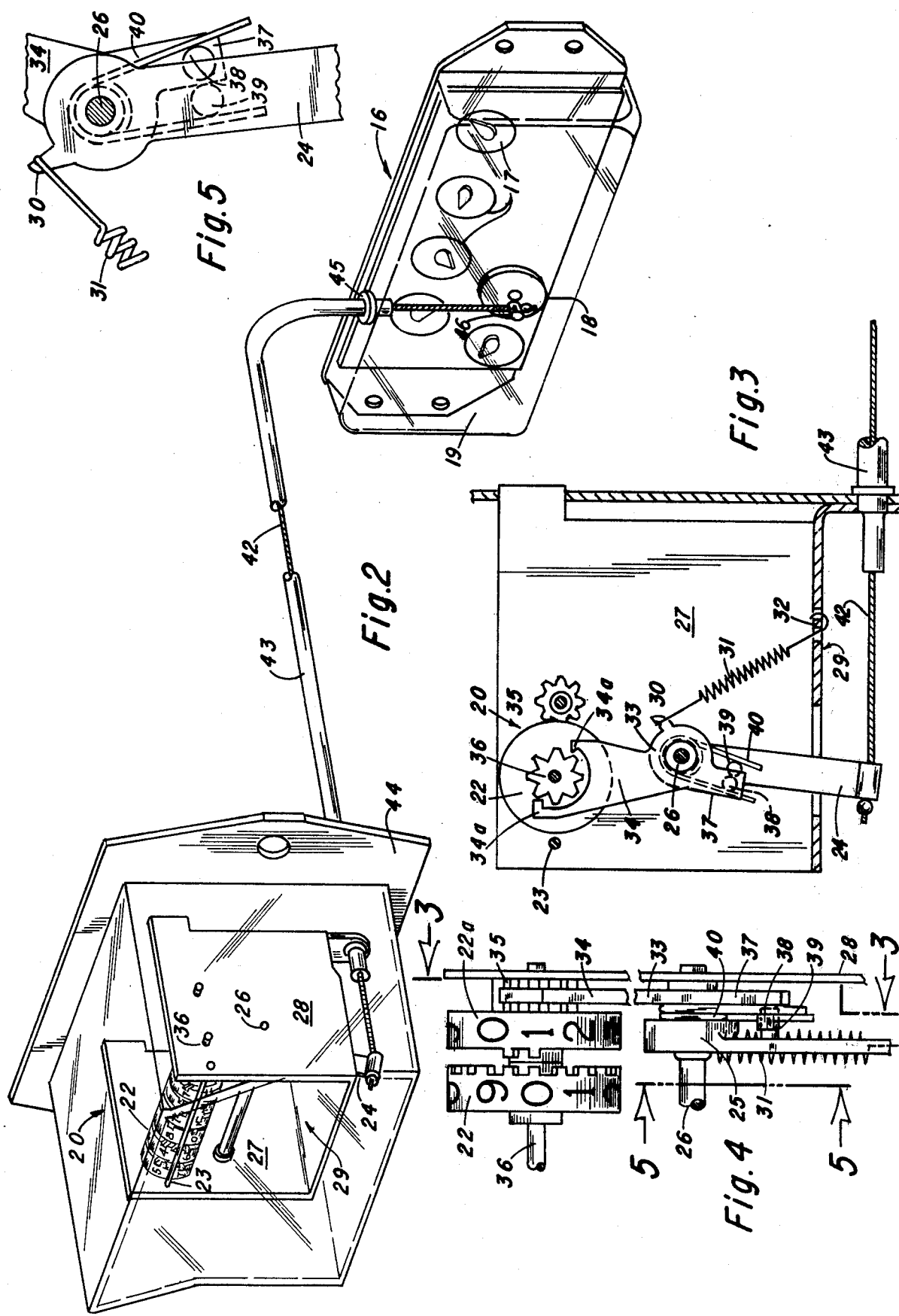

REMOTE DIGITAL INDICATOR ATTACHMENT FOR A GAS METER

BACKGROUND OF THE INVENTION

This invention relates generally to remote indicating devices for utility meters and the like. More particularly, this invention is concerned with an improved, meter driven, mechanical-type remote indicating device which uses a flexible cable to interconnect the meter index with a remote digital counter or readout device.

An age-old problem has been the reading of utility meters which are installed within a residence or building which is temporarily unattended. Utility companies unable to monitor the usage of metered utilities, such as gas, electric and water, encounter severe accounting problems, as well as adverse public relations when, because of temporary nonaccess to the meters, they are forced to use estimated billings that turn out to be either over or under the actual usage.

There are numerous causes which prevent a meter reader from gaining access to a meter which is installed interiorly of a home or building. The principal cause is the temporary absence of persons from the home at the time the meter reader calls to record a reading. Also, the increase in crime rate has caused many women to refuse everyone, including meter readers, access to their houses, especially when they are alone in their house. Regardless of the reason, it is a well-known fact that many residences go without monthly meter reading.

Many solutions to this problem have been proposed. Permitting the meter reader to retain a key to the premises has not won widespread acceptance, probably because of the fear of theft. Locating meters externally of a building is costly and subjects the meter to vandalism and other hazards.

Another solution is the use of remote meter reading devices. This is any device capable of transmitting an inside meter reading to some remote location, either by mechanical motion transmission means, by electrical means and/or by telemetry.

The present invention falls into the category of a relatively simple mechanical-type of remote read-out or indicator system for an interiorly stationed utility meter. Various different types and construction of so-called mechanical-type remote indicators have been heretofore proposed in the art, but by and large, the prior art remote indicators of which we are aware are unduly complicated and expensive due to inherent inefficiencies in their mechanical design and operating principles.

SUMMARY AND OBJECTS OF THE INVENTION

The remote read-out or indicating apparatus of this invention takes the form of a mechanical-type digital counter positioned on or adjacent an exterior wall or window of a building or house in a position to be read from outside the building, and having a reciprocative, spring-pressed actuator arm connected by a sheathed, flexible cable with a crank connected with and driven in rotation by the conventional index of the interiorly located meter.

The primary object of the present invention is to provide a comparatively inexpensive, mechanically efficient, and accurate remote indicating attachment for a meter which features a low friction, reciprocative cable as the motion transmitting link between the meter index and the remote digital counter or indicator, and wherein the cable is maintained in slight, but constant tension, so as to prevent slippage or kinking of the cable and consequent inaccuracy in the remote indicator readings.

Another object is to provide a cable transmission for a remote gas meter indicator which is highly flexible and which may be flexed in comparatively sharp angles without binding or imposing an intolerable friction load on the gas meter index drive.

A further object is to provide a remote indicator for a gas meter which is comparatively easily installed in an existing building structure with no modifications to the building structure.

For a further and more complete understanding of the invention and the various additional objects and advantages attendant thereto, reference is made to the following description and accompanying drawings.

BRIEF DESCRIPTION OF THE DRAWINGS

FIG. 1 is a side elevational view, partially in vertical section, showing the remote indicator attachment of this invention operatively installed within a building structure and connected with a basement located gas meter;

FIG. 2 is a schematic perspective view of the remote indicator attachment connected with the index of a gas meter;

FIG. 3 is detail vertical sectional view taken through the remote indicator or digital counter mechanism along the line of 3—3 of FIG. 4;

FIG. 4 is a fragmentary front elevational view looking toward a portion of the digital counter or indicator;

FIG. 5 is an enlarged, fragmentary vertical sectional view taken along the line 5—5 of FIG. 4.

FIG. 6 is a sectional view of the flexible cable and sheath taken along line 6—6 of FIG. 1; and FIG. 7 is a fragmentary sectional view illustrating the connection between the crank disk, index and cable.

DETAILED DESCRIPTION OF PREFERRED EMBODIMENT

Referring now to the drawings, FIG. 1 shows a conventional, diaphragm-type fuel gas meter 10 which is typically located in the basement of a residential building or house below the floor 11 and suspended from a floor joist 12 on strap hangers 13. A gas supply pipe or conduit 14 supplies gas to the meter 10 and an outlet conduit or distribution pipe 15 conducts gas from the meter to the furnace and other gas-burning appliances, not shown, of the house.

The meter 10 includes the usual indicator dial system which furnishes a visual record of the volume (cubic feet) of fuel gas which has passed through the meter. As usual, the index 16 of the meter includes a system of digitally graduated dials and gear-driven pointers 17 which function to visually indicate the volume of gas which has passed through the meter in terms of hundred-thousands, ten-thousands, thousands, and hundreds of cubic feet, respectively. However, as will be hereinafter more fully explained, the index 16 of the meter is modified to the extent of replacing the dial pointer normally associated with one of the other test dials with a crank disk 18. The index 16 also includes a transparent dust cover 19 which encloses and protects the indicator dials against entry of foreign matter. The structure of the disk is combined with the index in a manner to provide a safety feature which prevents breakage of the whole index should the freedom of rotation of the crank be impaired and said structure will be explained in more detail subsequently.

In accordance with the present invention, we mount a suitably encased and protected digital counter or indicator 20, for example, on an outside wall 21 of the house, or in some other suitable location remote from the meter 10, where it may be conveniently seen and read by a person outside the house in which the meter is installed. Preferably, the remote indicator 20 comprises a conventional low friction, multiple wheel-type digital counter in which a system of suitably graduated, gear-coupled wheels or dials 22 function in association with an index line or bar 23 to indicate the same readings as those of the dials 17 of the gas meter index 16. The remote indicator or counter 20 is actuated by back and forth reciprocation of a spring-biased actuator arm or lever 24.

As shown particularly in FIGS. 4 and 5, the actuator arm 24 is formed at its upper or inner end with an enlarged, generally circular hub portion 25 pivoted on a supporting shaft 26 which extends between and is supported at its ends by the upright side legs 27 and 28 of a U-shaped support frame 29. The hub portion 25 of the arm 24 is formed with a radially outwardly projecting, notched tang 30 to which is connected the outer end of a contractile spring 31. The opposite end of the spring 31 is anchored, as at 32, to the base leg of the supporting frame 29. Thus, the actuator arm 24 of the counter is biased by the spring 31 to pivot or move in a clockwise direction as viewed in FIG. 3.

Pivotally mounted on the shaft 26, adjacent the hub 25 of the actuator arm 24, is the hub portion 33 of a teetering pawl 34. The pawl 34 is formed at its upper or outer end with a pair of spaced apart fingers 34a and 34b which are arranged upon oscillation of the pawl 34 to alternately engage the teeth of a ratchet gear or pinion 35 which is connected to drive the indicating wheel or dial 22a of the digital counter (see FIGS. 3 and 4). In the usual manner, the ratchet gear 35 and the indicating wheels or dials 22 of the counter are rotatably mounted on a cross shaft 36 which is journalled in the opposite side legs 27 and 28 of the frame 29. The pawl 34 is also formed with a lower bell crank arm 37 which is formed with a laterally outwardly projecting circular boss or stud 38. The actuator arm 24 is also formed at the same elevation with an adjacent and relatively contacting circular boss or stud 39. The studs 38 and 39 are resiliently biased into relative engagement by the opposite legs of a spring clip 40 whose coiled central portion is mounted on the shaft 26 between the hub portions of the actuator arm 24 and the pawl 34. In addition to the obvious use which is to connect the actuator arm 24 to the pawl 34, the spring 40 serves as an "over travel" compensating device. That is, should the stroke of the cable draw the arm 24 beyond its designed arc of travel, the legs of spring 40 will flex to the degree of over travel and will bias the elements back into place on the return stroke.

As previously indicated, the construction and operation of the digital counter or indicator 20 is conventional and well understood by those familiar with the art. Hence, for the purposes of the present invention, a detailed description of each and every part of the counter mechanism will be omitted. Suffice it to say that each back and forth stroke of the reciprocating actuator arm 24 causes the pawl 34 to move the ratchet gear or drive pinion 35 through a predetermined arc, so that the wheels or dials 22 of the remote indicator will indicate in numbers the same reading as found on the dials 17 of the gas meter index 16.

According to this invention, a highly flexible stranded, stainless steel cable 42 is used as the motion-transmitting means between the crank disk 18 and the reciprocating actuator arm 24 of the remote indicator or counter 20. As shown particularly in FIGS. 2 and 3, the cable 42, for the most part of its length, is slidably and quite loosely encased in a flexible plastic outer sheath or bearing tube 43. The outer end of the sheath 43 is secured to the back mounting plate 44 of the remote indicator, whereas the opposite end of the sheath 43 is secured by a grommet-like fitting 45 to the transparent protective cover 19 of the meter index 16. On end of the cable 42 is suitably secured to the eccentric swivel crank pin 46 of the crank disk 18. The crank disk also comprises a central, tubular hub portion 18a which is frictionally press-fitted onto the outer end of the drive shaft 47 of the meter index which is designed to receive and drive a conventional pointer.

The opposite, outer end of the cable 42 is secured to the lower end of the actuator arm 24. The cable 42 is arranged so as to be in light, but constant, tension at all times (about 25–50 gms minimum, due to spring 31). This is accomplished by connecting the respective ends of the cable 42 to the crank pin 46 when it occupies a top dead center position, and to the actuator arm 24 when it occupies its outermost or extreme left hand position, as viewed from FIGS. 2 and 3. This insures that the cable 42 will always be under tension of the spring 31 which biases the actuator arm 24 in a clockwise direction toward the left as viewed in FIG. 3.

The maintenance of the cable 42 under light tension is important, since it is a highly flexible manner incapable of transmitting any useful amount of force in compression. At the same time, the highly flexible character of the cable 42 and its outer sheath enable it to be flexed to a relatively sharp angle without imposing high friction loads on the cable. This greatly facilitates installation by enabling the cable to be trained and flexed around and in relatively sharp corners, without binding and without placing an undue load on the relatively delicate drive mechanism or index of the meter 10.

The sheath as originally conceived was solely of plastic material such as polyethyene, nylon, etc. but under experimental use it was determined that differential expansion of the sheath and the stranded metallic cable caused problems of improper stroke length and cutting of the sheath at bends. The latter resulted in increased firctional drag on the cable and eventual malfunction due to breakage of th index at the gas meter (occasionally one of the gears). The differential thermal expansion problem was temporarily solved by using a metal sheath having a coefficient of thermal expansion close to that of the cable. However, due to wear and slow build-up of cable drag, the metal sheaths had similarly short useful lives (a few hundred thousand cycles).

As a result of these unsuccessful experiments a different sheath was adopted and the crank disk structure was redesigned.

The new sheath 43 was formed as illustrated in FIG. 6 with an outer annular layer 48 of polyproplyene and an inner concentric layer 49 of polyethylene. Between the two are strands 50 of stainless steel extending the full length of the sheath. Thus, with the polymer layers firmly bonded to the steel, the sheath takes on the lower coefficient of thermal expansion of the steel which eliminates the differential expansion problem. Accordingly, the wear at bends is reduced while the low friction polymer contact surface with the cable is retained. It has been experimentally determined that with a layered sheath as described, about 4.6 meters in length and with three 90° bends, the initial frictional drag is about 25 gms (plus or minus 20%), which remains relatively constant over several million reciprocations of the cable. Accordingly, the maximum cable tension should be no more than about 75 gms (50 gms maximum from spring 31 and 25 gms from friction). The drive shaft 47 as designed will fail at 1000 gms cable tension. It is important that a safety feature or "weak link" be incorporated into the system to prevent damage to the remainder of the index or meter. Shaft 47 is connected to a gear (not shown) which meshes with other gears to turn the pointers. Without the weak shaft or some other weak link, cable tension could twist and damage the gears and thereby prevent any recording of gas used. However, with the recessed portion 51 of the shaft, the shaft will snap before the gears are damaged.

The stem at 52 has a diameter of about 0.1800 cm. and the smallest inside diameter of the hub 18a of the disk is slightly smaller (about 0.1775 cm.) so that the hub must be pressed fitted over stem section 52. A drop of cyanocrylate adhesive is applied to section 52 just prior to the disk being forced into place. At the normal and expected 75 gms tension load the adhesive will hold through several million cycles.

The above described weak link mechanism is applicable to plastic drive shafts and not applicable to the more conventional brass drive shafts. Where brass is employed the same cyanocrylate adhesive is used but the failure is designed to occur at the adhesive joint. When the cable tension exceeds about 1000 gms the adhesive will fail and the brass shaft 47 will continue to rotate while the disk 18 will stop.

OPERATION

Upon installation, the remote digital counter or indicator 20 is suitably secured by its mounting plate 44 to the exterior wall 21, or in any other suitable location where it may be easily read by a person from outside the building in which the meter 10 is housed. The dials 22 of the counter 20 are then manually set to a reading corresponding to the reading of the dials 17 of the meter index 16. The outer end of the flexible cable 42 is secured in position through the actuator arm 24 of the counter 20, and the sheathed portion 43 of the cable is trained through openings formed in the wall 21, and in, around and through the building structure, backwardly to the meter index 16. The inner end of the cable is then secured in tension to the crand pin 46 when it occupies a top dead center position. The hub porition 18a of the crank disk 18 is press fitted and non-rotatively secured by cyanocrylate adhesive to the shaft 47 of the meter index. The remote indicator attachment is then ready for operation. As the crank disk 18 rotates in a counterclockwise direction (FIG. 2) from its top dead center position, the cable is drawn inwardly and the actuator arm 24 is moved in a counterclockwise direction (FIGS. 2 and 3) against the force of the spring 31. As the arm 24 is moved, the spring clip 40 which is engaged with the bosses 38 and 39 causes the pawl 34 to move in a counterclockwise direction until the finger 34b of the pawl engages and moves the gear or pinion 35 through a given arc. When the crank pin 46 of the disk 18 reaches its lowermost (180°) position, the actuator arm 24 has moved to its extreme rightward or counterclockwise position, and as the disk 18 continues to rotate, the spring 31 will continue to exert a tension force on the cable 42 and will move the actuator arm in a closkwise direction. Clockwise movement of the actuator arm 24 causes the pawl 34 to move in a corresponding clockwise arc during which movement, the finger 34a of the pawl engages and rotates the pinion or gear 35 another increment. Thus, for each 360° of rotation of the crank disk 18, the pawl 34 advances the drive pinion 35 of the counter two increments and this movement is translated by the gearing of the counter dials 22, so that they will indicate the same reading as the dials 17 of the meter index.

It is also important to note that by maintaining the cable 42 in tension at all times, the additional work load imposed on the index drive of the meter by the remote indicating system is minimal. Thus, as the crank pin 46 rotates from a top dead center position through its first 180° of arc, the index of the meter must drive the cable 42 and actuator arm 24 against the force of the spring 31. However, as the crank pin 46 reaches its 180° position, the spring 31 takes over and pulls the arm 24 and cable 42 back to their original location as the disk continues to rotate. The work load on the meter index is therefore, substantially counterbalanced by the spring 31 of the counter, and this aids in preventing slowing down of the operation of the meter. In view of the foregoing, it will be seen that this invention provides a mechanically simple, yet efficient remote indicator adapted to be attached to and driven by the usual index drive of a conventional gas meter. By utilizing a light-weight, flexible cable under tension as the motion transmitting drive between the meter index and the remote indicator, work loads on the meter index are greatly reduced in comparison to the use of a push-pull type of control wire. Also the light-weight flexible cable greatly facilitates installation by permitting the cable to be flexed around relatively sharp corners and generally trained through areas not possible with a relatively stiff push-pull type wire or cable.

While a single preferred embodiment has been illustrated and described in detail, it should be understood that various modifications in design and details of construction are possible without departing from the spirit of this invention or the scope of the following claims.

We claim:
1. A remote meter reading assembly for a meter having a rotary index shaft comprising: a circular disc mounted on the index shaft of a meter; a digital counter adapted to be mounted in remote relation to the meter and having a reciprocative actuator arm; a flexible cable connected in constant tension between the actuator arm of said counter and an eccentric crank pin mounted on said disc whereby upon rotation of said shaft and disc the actuator arm is moved in one direction only; spring means connected with the actuator arm of said counter for moving it in the opposite direction; a sheath of polymeric material loosely circumscribing the cable for most of its length and including strands of a material embedded in the polymeric material which extends the length of the sheath, said sheath having a coefficient of thermal expansion substantially the same as the cable and means for disengaging the disc from the rotary shaft upon application of excess tension to the cable.

2. A remote meter reading assembly according to claim 1 wherein the cable is stranded stainless steel and the strands of material embedded in the polymeric sheath are steel.

3. A remote meter reading assembly according to claim 2 wherein the polymeric material comprises concentric layers of polyethylene and polyproplyene.

4. A remote reading assembly according to claim 3 wherein the layer of polyethylene is disposed as the innermost layer.

5. A remote meter reading assembly according to claim 1 wherein the polymeric material comprises concentric layers of polyethylene and polyproplyne.

6. A remote meter reading assembly according to claim 5 wherein the layer of polyethylene is disposed as the innermost layer.

* * * * *